(12) United States Patent
Berry et al.

(10) Patent No.: US 11,187,095 B1
(45) Date of Patent: Nov. 30, 2021

(54) MAGNETIC AFT FRAME SIDE SEALS

(71) Applicant: General Electric Company, Schenectady, NY (US)

(72) Inventors: Jonathan Dwight Berry, Simpsonville, SC (US); Michael John Hughes, State College, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/136,140

(22) Filed: Dec. 29, 2020

(51) Int. Cl.
    *F01D 9/02* (2006.01)
    *F01D 11/00* (2006.01)
    *F16J 15/43* (2006.01)

(52) U.S. Cl.
    CPC ............ *F01D 11/005* (2013.01); *F01D 9/023* (2013.01); *F05D 2240/55* (2013.01); *F16J 15/43* (2013.01)

(58) Field of Classification Search
    CPC ...... F01D 9/023; F01D 11/003; F01D 11/005; F01D 25/12; F16J 15/43; F05D 2240/55
    See application file for complete search history.

(56) References Cited

U.S. PATENT DOCUMENTS

| | | | |
|---|---|---|---|
| 4,513,567 A | 4/1985 | Deveau et al. | |
| 6,152,685 A | 11/2000 | Hagi | |
| 6,220,602 B1 | 4/2001 | Webster et al. | |
| 6,450,762 B1 | 9/2002 | Munshi | |
| 6,877,952 B2 | 4/2005 | Wilson | |
| 7,249,769 B2 * | 7/2007 | Webster | F01D 11/025 277/410 |
| 9,360,118 B2 | 6/2016 | Fukuhara | |
| 9,528,383 B2 * | 12/2016 | Belsom | F01D 11/003 |
| 9,771,821 B1 * | 9/2017 | Mills | F16J 15/445 |
| 9,829,106 B2 * | 11/2017 | Thackway | F01D 9/023 |
| 10,865,653 B2 * | 12/2020 | De La Bruere Terreault | F16J 15/3444 |
| 2010/0327534 A1 | 12/2010 | Powar et al. | |
| 2014/0023489 A1 * | 1/2014 | Fujimoto | F23R 3/46 415/170.1 |
| 2019/0063240 A1 * | 2/2019 | Okazaki | F01D 9/023 |
| 2019/0195078 A1 * | 6/2019 | Blais | F01D 11/003 |
| 2020/0141586 A1 * | 5/2020 | Igarashi | F23R 3/46 |
| 2021/0172329 A1 * | 6/2021 | Schiavo | F01D 11/005 |
| 2021/0189896 A1 * | 6/2021 | Kono | F01D 11/005 |

FOREIGN PATENT DOCUMENTS

| | | |
|---|---|---|
| GB | 2108586 A | 5/1983 |
| JP | 3564286 B2 | 9/2004 |

* cited by examiner

*Primary Examiner* — Courtney D Heinle
*Assistant Examiner* — Sang K Kim
(74) *Attorney, Agent, or Firm* — Dority & Manning, P.A.

(57) ABSTRACT

A sealing arrangement includes a first aft frame and a second aft frame neighboring one another. The first aft frame and the second aft frame each include an inner portion and an outer portion. The outer portion radially separated from the inner portion. The first aft frame and the second aft frame further include a first side portion and a second side portion that each extend radially between the inner portion and the outer portion. A circumferential gap is defined between the first side portion of the first aft frame and the second side portion of the second aft frame. The sealing arrangement further includes a side seal that extends across the circumferential gap. The side seal includes one or more magnets. The side seal is at least partially held in place by the one or more magnets.

20 Claims, 7 Drawing Sheets

MAGNETIC AFT FRAME SIDE SEALS

FIELD

The present disclosure relates generally to a sealing arrangement for a turbomachine. In particular, the present disclosure relates to an improved combustor aft frame sealing arrangement.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The combustion section of a gas turbine typically includes combustors that are coupled to a stage-one nozzle of the turbine section via transition ducts. Generally, each transition duct has an aft frame positioned adjacent to an inlet side of the turbine section. The aft frame will usually have two arcuate portions which are referred to as inner and outer portions, being inner and outer in the radial direction with respect to the centerline axis of the turbine. The inner and outer portions of the aft frame are interconnected by radially extending linear portions, often referred to as side portions. A sealing assembly is typically used to seal between the aft frame and the inlet of the turbine section. In particular, inner and outer circumferential seals are used to seal between the inner and outer portions of the aft frame and the corresponding inlet of the turbine section. Likewise, radially oriented side seals can be disposed between adjacent aft frames to substantially close and seal off the circumferential gaps between the side portion of one aft frame and the next aft frame.

The sealing assembly positioned about the aft frame generally functions to prevent the high temperature combustion gases being diluted with compressed air prior to entrance into the turbine section.

However, issues exist with the use of many known sealing assemblies. For example, the high temperature of the combustion gases can cause damage to the sealing assembly over time, which may result in a limited life and decreased durability of the assembly. In addition, thermal expansion and vibrational movement of the aft frame and the stage one nozzle during operation of the gas turbine can cause the sealing assemblies to misalign and/or entirely decouple, which results in an incomplete seal between the components.

Accordingly, an improved sealing assembly is desired in the art. In particular, an improved sealing assembly for a gas turbine engine that has increased durability and alignment is desired, thereby prolonging the overall life and durability of the sealing assembly.

BRIEF DESCRIPTION

Aspects and advantages of the sealing arrangements and turbomachines in accordance with the present disclosure will be set forth in part in the following description, or may be obvious from the description, or may be learned through practice of the technology.

In accordance with one embodiment, a sealing arrangement for a turbomachine is provided. The sealing arrangement includes a first aft frame and a second aft frame neighboring one another. The first aft frame and the second aft frame each include an inner portion and an outer portion. The outer portion radially separated from the inner portion. The first aft frame and the second aft frame further include a first side portion and a second side portion that each extend radially between the inner portion and the outer portion. A circumferential gap is defined between the first side portion of the first aft frame and the second side portion of the second aft frame. The sealing arrangement further includes a side seal that extends across the circumferential gap. The side seal includes one or more magnets. The side seal is at least partially held in place by the one or more magnets.

In accordance with another embodiment, a turbomachine is provided. The turbomachine includes a compressor section, a turbine section, and a combustor section. The combustor section being positioned upstream from the turbine section and downstream from the compressor section. A first combustor and a second combustor neighbor one another within the combustor section. The first combustor and the second combustor each include a transition duct having an upstream end and a downstream end. A first aft frame surrounds the downstream end of the transition duct of the first combustor. A second aft frame surrounds the downstream end of the transition duct of the second combustor. The first aft frame and the second aft frame each include an inner portion and an outer portion radially separated from the inner portion. The first aft frame and the second aft frame each further include a first side portion and a second side portion that each extend radially between the inner portion and the outer portion. A circumferential gap is defined between the first side portion of the first aft frame and the second side portion of the second aft frame. The sealing arrangement further includes a side seal that extends across the circumferential gap. The side seal includes one or more magnets. The side seal is at least partially held in place by the one or more magnets.

These and other features, aspects and advantages of the present sealing arrangements and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present sealing arrangements and turbomachines, including the best mode of making and using the present systems and methods, directed to one of ordinary skill in the art, is set forth in the specification, which makes reference to the appended figures, in which.

DETAILED DESCRIPTION

Figure 1:
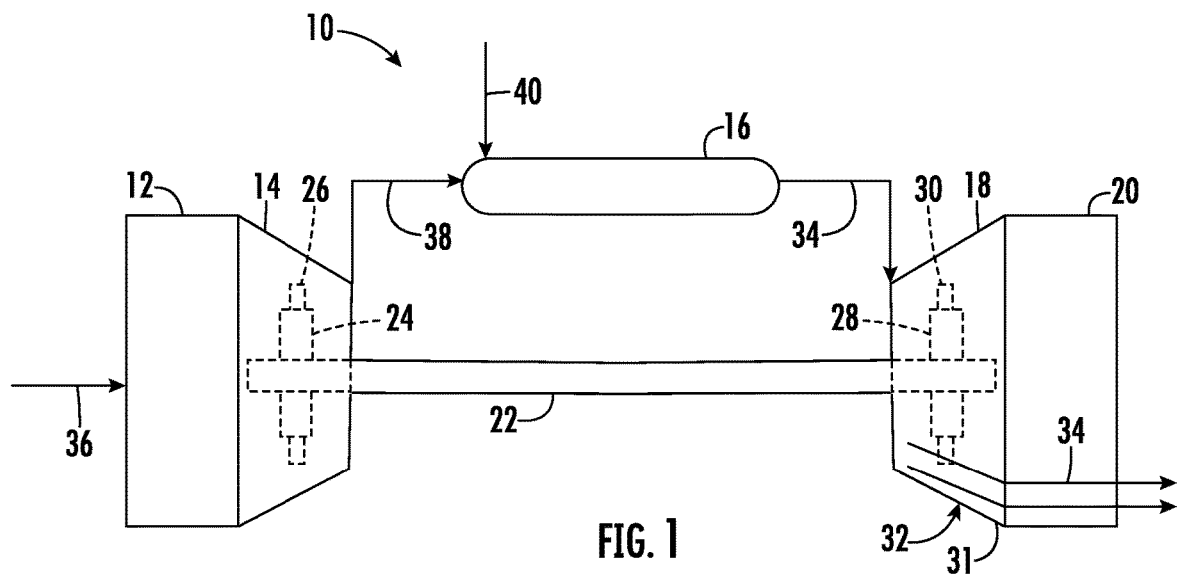
FIG. 1 is a schematic illustration of a turbomachine in accordance with embodiments of the present disclosure.

Reference now will be made in detail to embodiments of the present sealing arrangements and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air 36 flows through the inlet section 12 and into the compressor section 14 where the air 36 is progressively compressed, thus providing pressurized air or compressed air 38 to the combustors 17 (FIG. 2) of the combustor section 16. The compressed air 38 is mixed with fuel 40 and burned within each combustor 17 (FIG. 2) to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
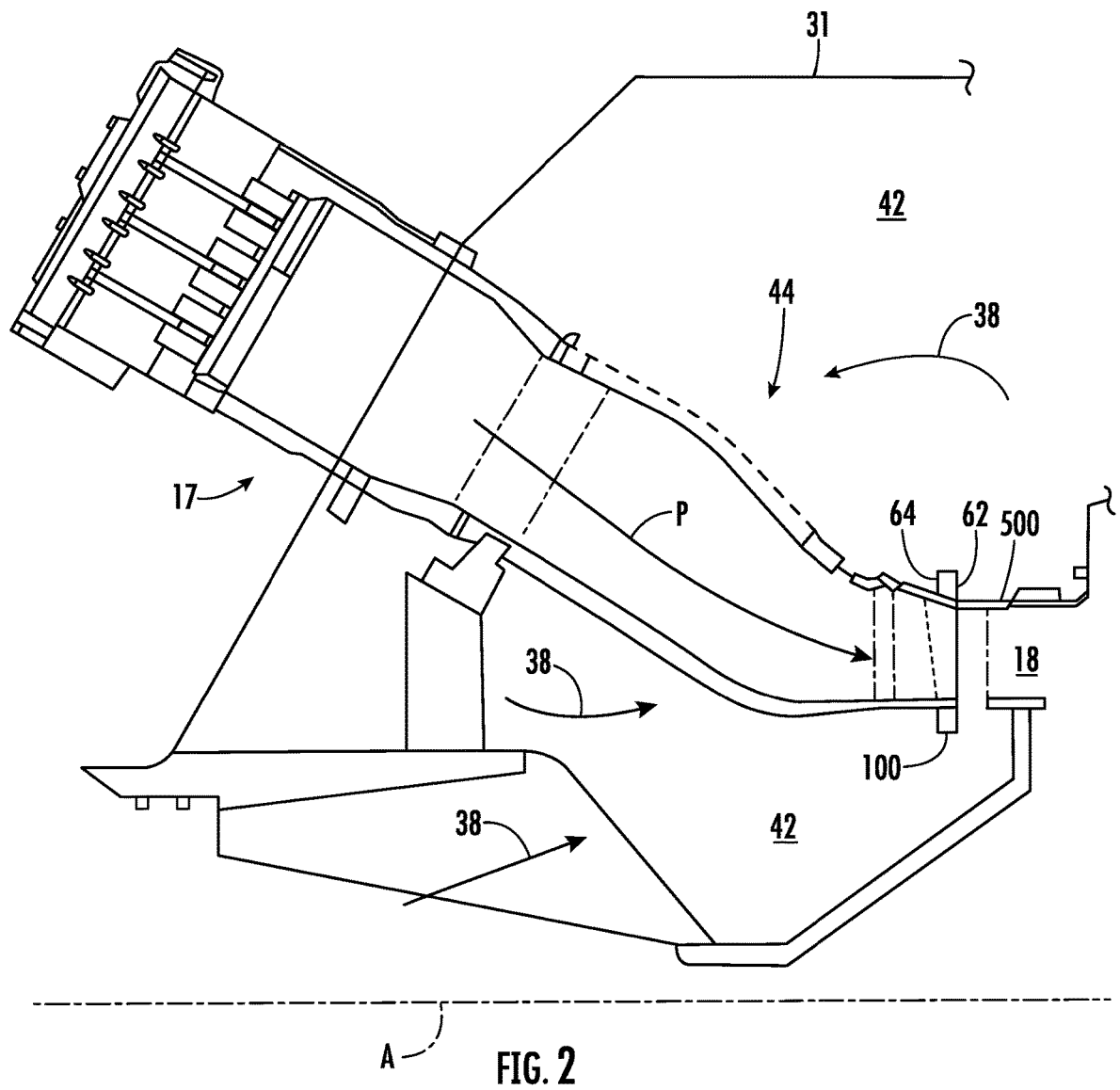
FIG. 2 illustrates a section view of a combustor in accordance with embodiments of the present disclosure.

As shown in FIG. 2, a combustor 17 may be at least partially surrounded by an outer casing 31 such as a compressor discharge casing. The outer casing 31 may at least partially define a high-pressure plenum 42 that at least partially surrounds various components of the combustor 17, such as transition duct 44. The high-pressure plenum 42 may be in fluid communication with the compressor 14 (FIG. 1) so as to receive the compressed air 38 therefrom. As illustrated in FIG. 2, the combustor 17 may be connected to a stage-one nozzle 500 of turbine 18 via a transition duct 44 including an aft frame 100. As shown in FIG. 2, the aft frame 100 may define an aft face 62 and a forward face 64. The transition duct 44 defines a flow path P. Also shown in FIG. 2 is the central axis A of turbine 18, which defines an axial direction substantially parallel to and/or along axis A, a radial direction R (FIG. 3) perpendicular to axis A, and a circumferential direction C (FIG. 3) extending around axis A.

Figure 3:
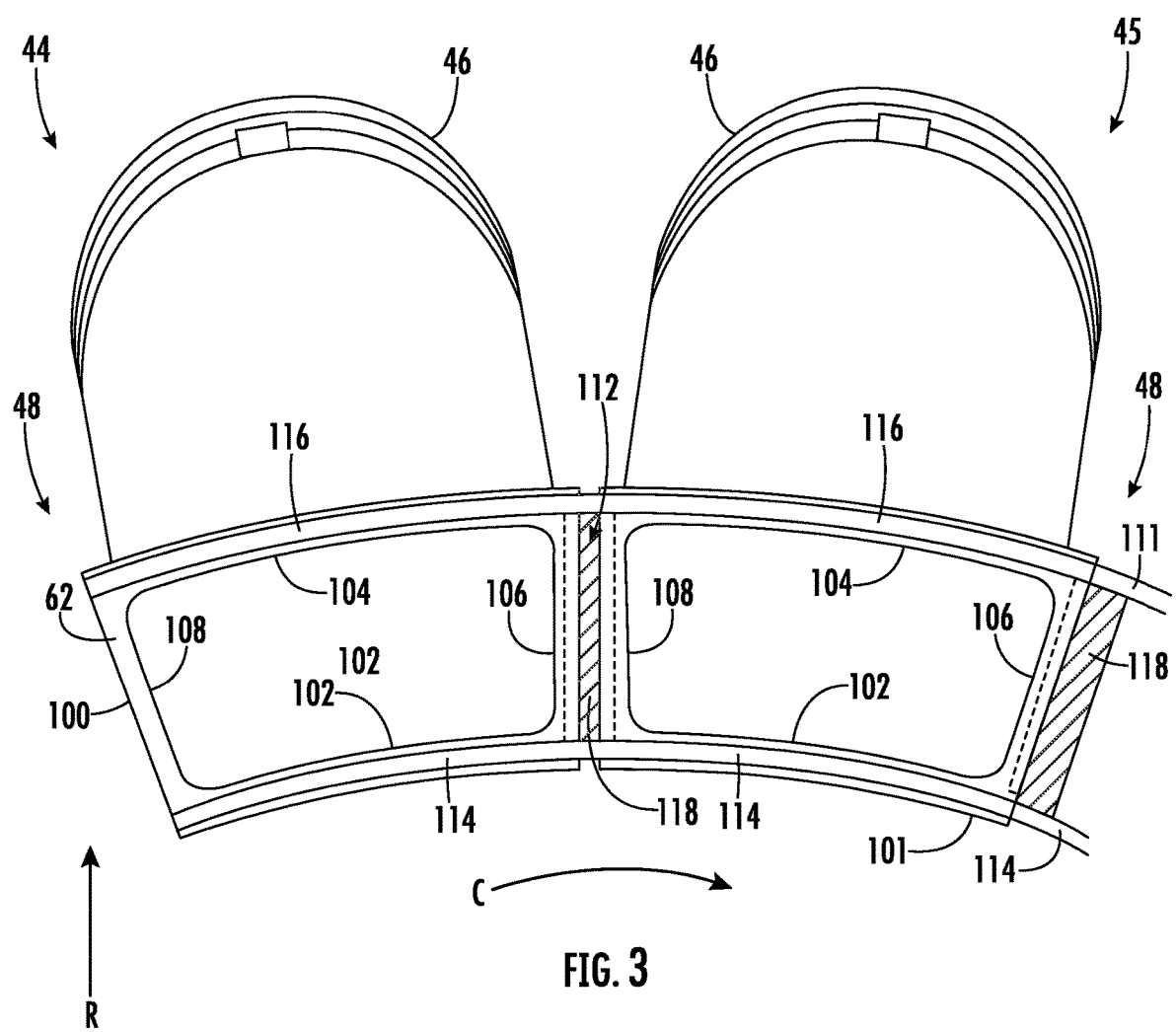
FIG. 3 illustrates a perspective view of circumferentially adjacent transition ducts in accordance with embodiments of the present disclosure.

Referring now to FIG. 3, a first transition duct 44 and a second transition duct 45 are illustrated, each having an upstream end 46 and a downstream end 48. As shown, a first aft frame 100 surrounds the downstream end 48 of the first transition ducts 44, and a second aft frame 101 surrounds the downstream end 48 of the second transition duct 45. As illustrated in FIG. 3, in some embodiments, the aft frames 100, 101 may each include an inner portion 102 and an outer portion 104 radially separated from one another. A first side portion 106 and a second side portion 108 may extend radially between the inner and the outer portions 102 and 104. For example, the transition ducts 44, 45 may be arranged such that the first side portion 106 of the first aft frame 100 is spaced apart from the second side portion 108 of the second aft frame 101, thereby defining a circumferential gap 112 therebetween. In many embodiments, the first side portion 106 of the first aft frame 100 and the second side portion 108 of the second aft frame 101 may be generally parallel to one another. Also illustrated in FIG. 3 is an inner seal 114 and an outer seal 116 respectively disposed on the inner portion 102 and outer portion 104 of each aft frame 100. In some embodiments, as shown, the inner seal 114 and the outer seal 116 may each be a singular seal that extends in the circumferential direction continuously between the transition ducts 44. In other embodiments, the inner seal 114 and the outer seal 116 may each be divided into one or more connected segments. In exemplary embodiments both the inner seal 114 and the outer seal 116 extend across (or traverse) the circumferential gap 112, such that the side seal 118 is disposed radially between the inner seal 114 and the outer seal 116.

As shown in FIG. 3, inner seal 114 and outer seal 116 may be circumferentially oriented with respect to a circumferential direction C of the gas turbine 10. For example, each inner seal 114 is circumferentially aligned with the other inner seal 114 on the adjacent aft frame 100, and each outer seal 116 is circumferentially aligned with the other outer seal 116 on the adjacent aft frame 100. Thus, inner seals 114 and outer seals 116 may be collectively referred to as circumferentially oriented seals.

In the description herein, certain features of the aft frames 100, 101, stage-one nozzle 500, and seals, 114, 116, and 118, will be described with reference to one or the other of inner portion 102/inner seal 114 and outer portion 104/outer seal 116, nonetheless, it will be recognized by one of ordinary skill in the art that such features can be associated with either or both of inner portions 102 and/or outer portions 104.

Figure 4:
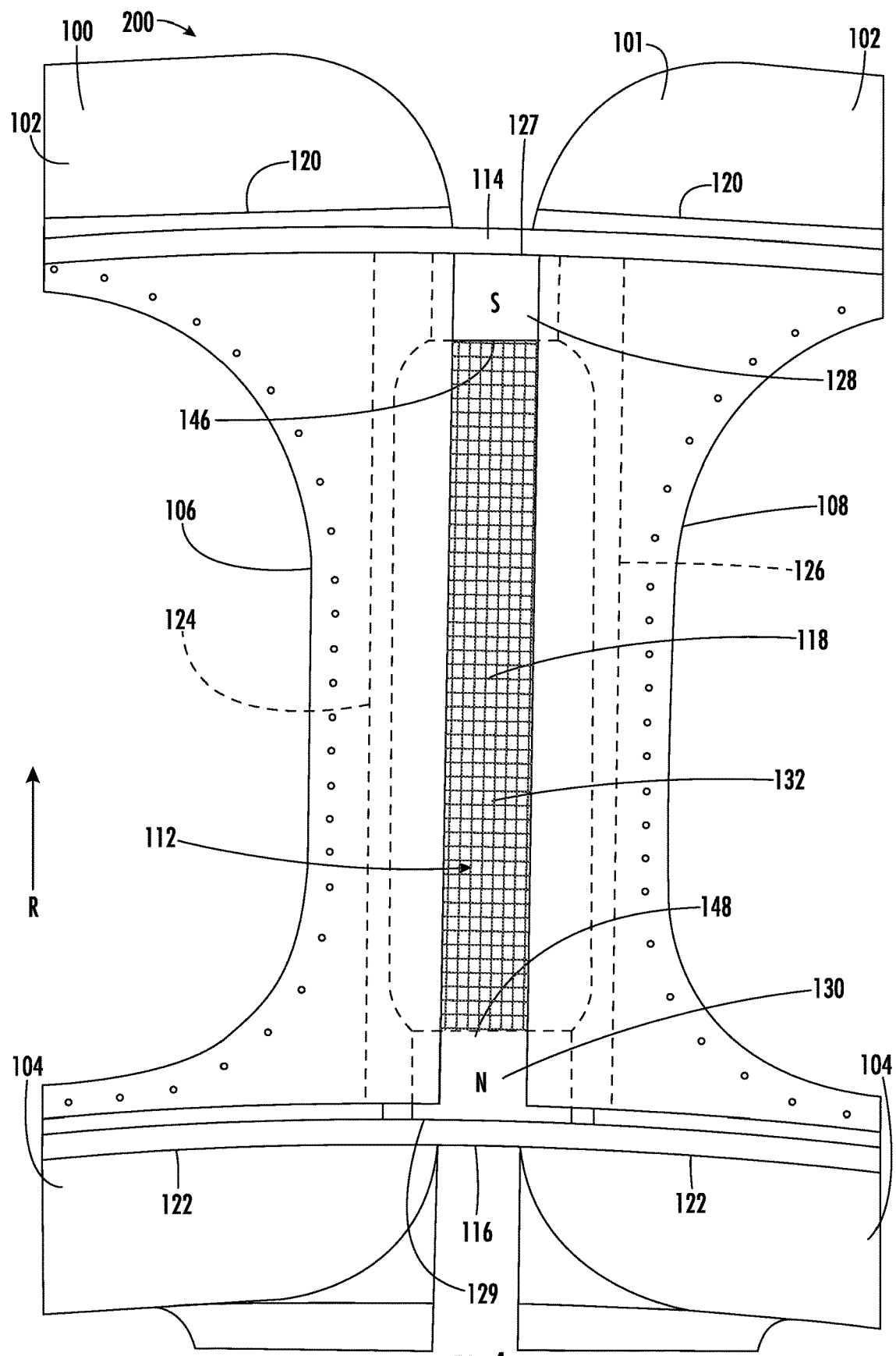
FIG. 4 illustrates a sealing arrangement, in which a first aft frame and a second aft frame are enlarged, in accordance with embodiments of the present disclosure.
Figure 5:
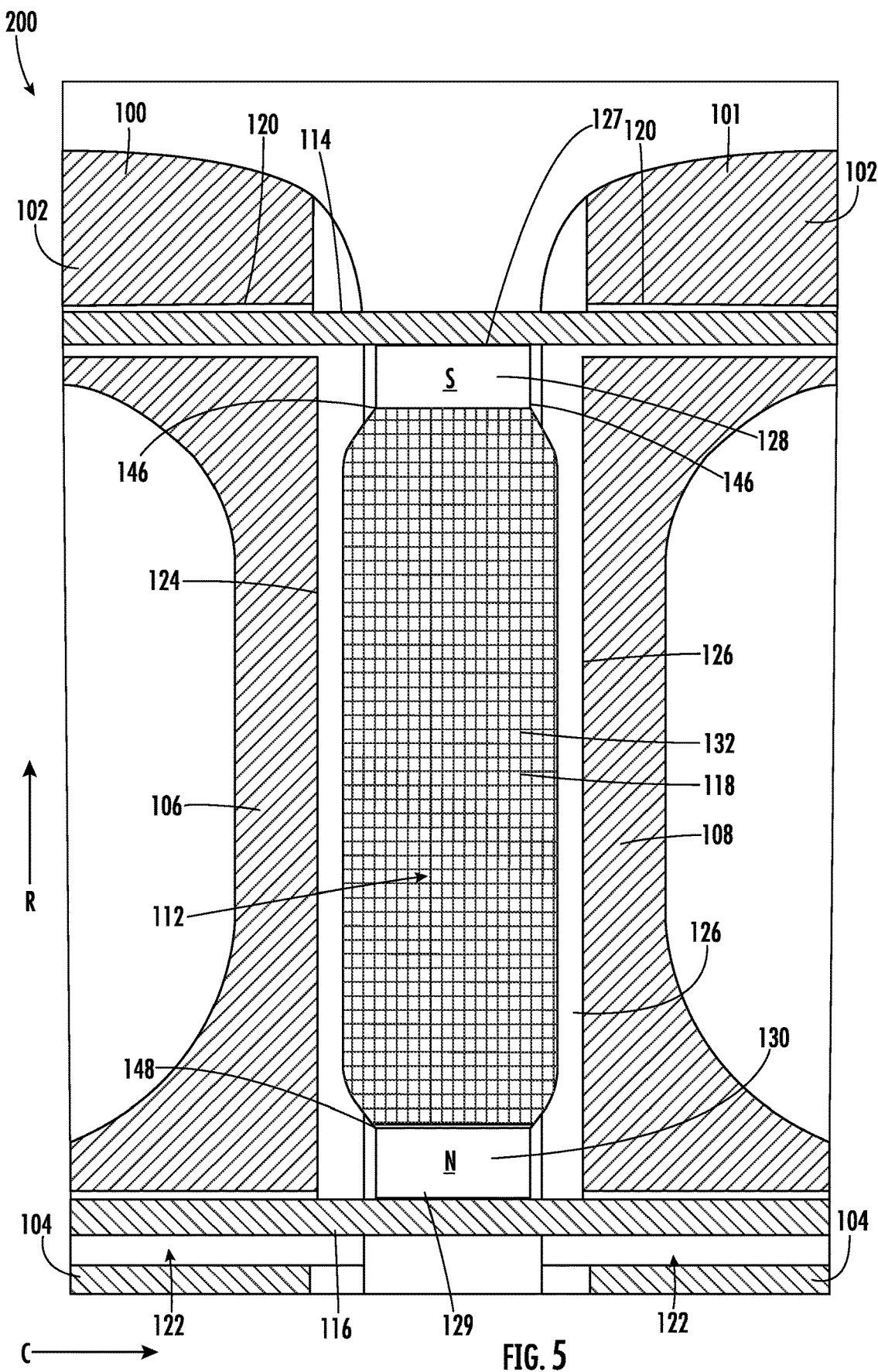
FIG. 5 illustrates a cross-sectional view of the sealing arrangement shown in FIG. 4 from along an axial location that exposes the slots, in accordance with embodiments of the present disclosure.
Figure 6:
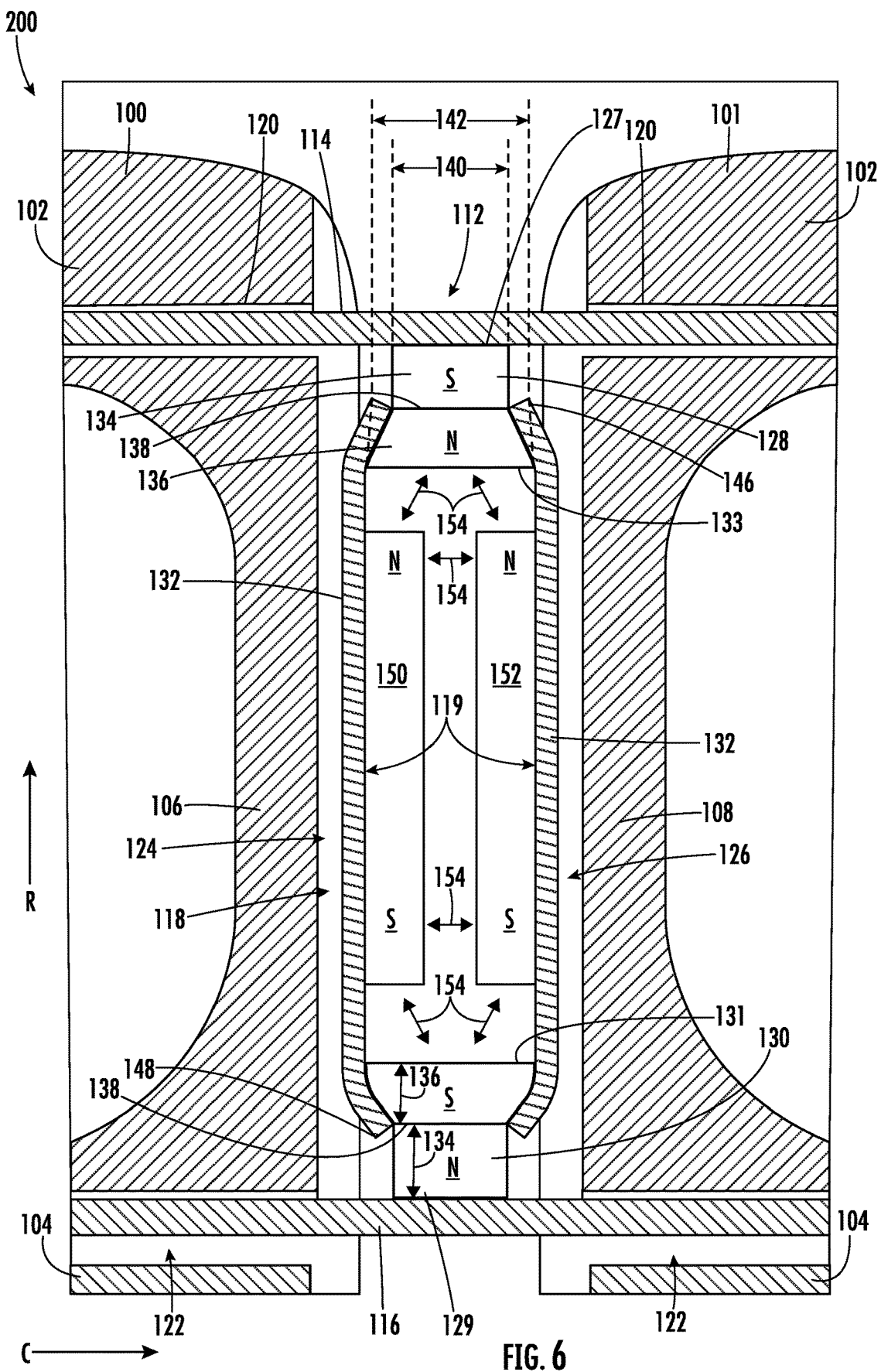
FIG. 6 illustrates a cross-sectional view of the sealing arrangement shown in FIG. 4 at an axial location that exposes the internal configuration of the side seal, in accordance with embodiments of the present disclosure.

FIG. 4 illustrates a sealing arrangement 200, in which the first aft frame 100 and the second aft frame 101 are enlarged to illustrate how the various seals 114, 116, 118 are arranged, in accordance with embodiments of the present disclosure. FIG. 5 illustrates a cross-sectional view of the sealing arrangement 200 shown in FIG. 4 from along an axial location that exposes the slots 120, 122, 124, 126 (in which the seals 114, 116, 118 are held during operation). FIG. 6 illustrates a cross-sectional view of the sealing arrangement 200 shown in FIG. 4 at an axial location that exposes the internal configuration of the side seal 118.

As shown in FIGS. 4-6 collectively, the sealing arrangement 200 includes the first aft frame 100 and the second aft frame 101 neighboring one another. As discussed above in detail, the first aft frame 100 and the second aft frame may each include an inner portion 102 and an outer portion 104. The inner portion 102 and the outer portion 104 may be spaced apart from one another and may co-extend in the circumferential direction C of the gas turbine 10, such that the inner portion 102 and the outer portion 104 are generally curved to correspond with the circumferential direction C. In this way, when all of the combustors 17 are assembled in the combustion section 16, the collective inner portions 102 of the aft frames 100 may define a segmented inner ring that extends around the centerline of the gas turbine 10 (along the circumferential direction C). Similarly, when all of the combustors 17 are assembled in the combustion section 16, the collective outer portions 104 of the aft frames 100 may define a segmented outer ring that extends around the centerline of the gas turbine 10 (along the circumferential direction C).

The aft frames 100, 101 may each include a first side portion 106 and a second side portion 108 spaced apart from one another and each extending between the inner portion 102 and outer portion 104. In many embodiments, first side portion 106 and the second side portion 108 may each be substantially straight members that extend generally along the radial direction R of the gas turbine 10.

Figure 7:
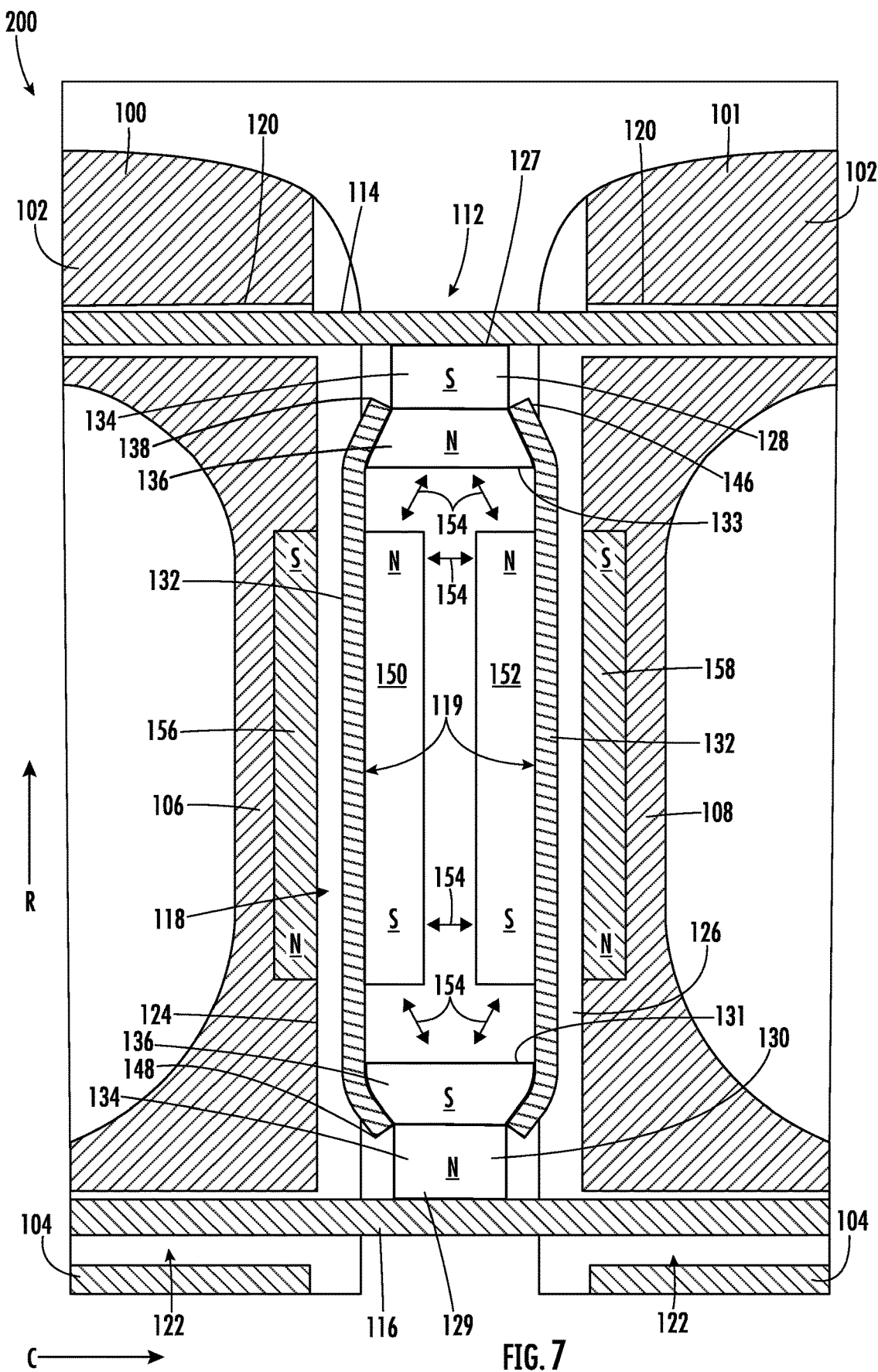
FIG. 7 illustrates an alternative embodiment of a cross-sectional view of the sealing arrangement shown in FIG. 4 at an axial location that exposes the internal configuration of the side seal, in accordance with embodiments of the present disclosure.

In particular embodiments, as shown in FIGS. 6 and 7, the aft frames 100, 101 may each define notches or slots 120, 122, 124, 126 along a respective portion 102, 104, 106, 108 of the aft frames 100, 101 for partially receiving the seals 114, 116, 118. For example, an outer slot 120 may be defined along the outer portion 102 of the aft frames 100, 102 for partially receiving the outer seal 114, and an inner slot 122 may be defined along the inner portion 104 of the aft frames 100, 101 for partially receiving the inner seal 116. Similarly, a first side slot 124 may be defined along the first side portion 106 of each of the aft frames 100, 101 in order to partially receive a side seal 118, and a second side slot 126 may be defined along a second side portion 108 of each of the aft frames 100, 101 in order to partially receive the side seal 118.

In some embodiments, the slots 120, 122, 124, 126 may be interconnected such that they extend entirely around the perimeter of the respective aft frames 100, 101 (e.g., the slots 120, 122, 124, 126 may extend continuously through the side portions 106 and 108 and the inner and the outer portions 102 and 104) for receiving both inner seal 114 and outer seal 116 as well a side seal 118 that is radially-oriented and provided between adjacent aft frames 100, 101. It is also possible in some embodiments to provide separate slots or notches for each of the seals 114, 116, and 118, such that the slots 120, 122, 124, 126 may be separately defined and not interconnected or continuous.

As shown in FIGS. 4 and 5, the first side portion 106 of the first aft frame 100 may neighbor (e.g. may directly neighbor or be immediately adjacent) the second side portion 108 of the second aft frame 100, such that a circumferential gap 112 is defined the first side portion 106 of the first aft frame 100 and the second side portion 108 of the second aft frame 101. In many embodiments, the first side portion 106 of the first aft frame 100 and the second side portion 108 of the second aft frame 101 may be generally parallel to one another, such that the circumferential gap 112 is equidistant at every radial location between the portions 106 and 108.

In exemplary embodiments, as shown, both the outer seal 116 and the inner seal 114 each extend across the circumferential gap 112. As a result, the outer seal 116 and the inner seal 118 create radially outer and inner boundaries within which the side seal 118 is contained. For example, the side seal 118 may extend radially between the outer seal 116 and the inner seal 114.

As shown in FIGS. 4-6, a side seal 118 may extend across the circumferential gap 112, thereby preventing the combustion gases from being diluted with compressed air prior to entrance into the turbine section 18. For example, the side seal may extend between the inner seal 114 and the outer seal 116. In many embodiments, the side seal 118 may extend generally radially between the inner seal 114 and the outer seal 116 and across the circumferential gap 112, which advantageously prevents compressed air from entering the hot gas path between the aft frames 100 and 101.

In exemplary embodiments, as shown, the side seal 118 may extend from within the first side slot 124 defined in the first side portion 106 of the first aft frame 100, across the circumferential gap 112, to within the second side slot 126 defined in the second side portion 108 of the second aft frame 101. The side seal 118 may be at least partially forced into sealing engagement with the first aft frame 100 and the second aft frame 101 by pressure from the compressed air within the high pressure plenum 42, which produces a force on the side seal 118 in the axial direction A (i.e. out of the page in FIGS. 4-6).

In particular embodiments, the side seal 118 may further include a radially outer magnet 128, a radially inner magnet 130, and an outer shell 132. The radially outer magnet 128 may couple (e.g. directly couple) to the outer seal 114. For example, a first end 127 of the radially outer magnet 128 of the side seal 118 may magnetically couple to the outer seal 114 via an attractive magnetic force between the radially outer magnet 128 and the outer seal 116. Likewise, the radially inner magnet 130 may couple (e.g. directly couple) to the inner seal 116. For example, the first end 129 of the radially inner magnet 130 of the side seal 118 may magnetically couple to the inner seal 116 via an attractive magnetic force between the radially inner magnet 130 and the inner seal 116. In this way, the side seal 118 may be at least partially held in place by the radially outer magnet 128 and the radially inner magnet 130, which may advantageously allow for movement of the aft frames 100, 101 during operation without misaligning the side seal 118. In such embodiments, both the outer seal 114 and the inner seal 116 may be formed from a ferrous (or iron containing) metal, such that magnets 128, 130 are attracted thereto.

For example, the radially inner seal 116, the radially outer seal 114, and the side seal 118 may be composed (at least partially) of a flexible sealing element, such as a ferrous (or non-ferrous in some embodiments) metallic cloth material. More specifically, the outer shell 132 of the side seal may be composed of the flexible sealing element. For example, the flexible sealing element may be a woven mesh cloth of a suitable metal material. The materials of the flexible sealing element may be layered, e.g., a single sheet of cloth material, may be folded over on itself, and/or multiple layers of cloth material may be welded together. In other embodiments (not shown), the inner seal 116 and the outer seal 114 may each include one or more permanent magnets that magnetically attract the respective radially inner magnet 130 and the respective radially outer magnet 128 thereto. In this way, the flexible sealing element may be a non-rigid compliant material that allows the seals 116, 114, 118 to bend and/or flex under loading during operation, which enables proper seal alignment at all thermal states of the combustors 17.

The outer shell 132 of the side seal 118 may at least partially surround the radially inner magnet 130 and the radially outer magnet 128. For example, the outer shell 132 may extend annularly around a portion of both magnets 128, 130, such that a portion of the magnets 128, 130 are exposed (e.g. to compressed air and/or combustion gases). For example, as shown, the radially outer magnet 128 may extend radially outwardly from the outer shell 132 and magnetically couple directly to the outer seal 114, and the radially inner magnet 130 may extend radially inwardly from the outer shell 132 and magnetically couple directly to the inner seal 116. In other embodiments (not shown), the magnets 128, 130 may be entirely encapsulated within the outer shell 132, such that no portion of the magnets 128, 130 are exposed (e.g. to compressed air and/or combustion gases).

In many embodiments, the radially outer magnet 128 and the radially inner magnet 130 may each include a first portion 134 and a second portion 136. The first portion 134 may extend between respective first ends 127, 129 and a respective transition point 138, which is disposed between the first portion 134 and the second portion 136. Likewise, each of the second portions 136 may extend from the respective transition point 138 to respective second free ends 133, 131. As shown, the first portion 134 may define a first width 140 and the respective second free ends 133, 131 may define a second width 142. As shown in FIG. 6, the second width 142 may be larger than the first width 140, such that the second portion 136 diverges circumferentially outwardly from the transition point 138 to the respective free ends 133, 131 of the magnets 128, 130. For example, the magnets 128, 130 may taper from the first width 140 to the second width 142, in order to couple the magnets 128, 130 to the interior surface 119 of the outer shell 132.

In exemplary embodiments, the outer shell 132 may couple second portion 136 of the radially outer magnet 128 at a first end 146 and may couple to the second portion 136 of the radially inner magnet 130 at a second end 148. In some embodiments, the outer shell 132 may be slidably coupled to the radially outer magnet 128 and the radially inner magnet 130, such that radial movement of the aft frames 100, 101 would result in the outer shell 132 sliding in the radial direction relative to the magnets 128, 130. In other embodiments, the interior surface 119 of the outer shell 132 may be fixedly coupled to both the magnets 128, 130, such that radial movement of the aft frames 100, 101 would result in the outer shell 132 bending and/or flexing.

In many embodiments, the side seal 118 further includes a first side magnet 150 and a second side magnet 152 are positioned within the outer shell 132 of the side seal 118 opposite one another. For example, as shown, the first side magnet 150 and the second side magnet 152 may be coupled to an interior surface 119 of the outer shell 132. In many embodiments, the first side magnet 150 and the second side magnet 152 may be substantially the same size (e.g. exactly the same size in some embodiments) and may be spaced apart from one another on opposite sides of the side seal 118, in order to evenly distribute the repulsive magnetic forces 154. For example, the first side magnet 150 may be positioned along (but spaced apart from by the outer shell 132) the first side portion 106 of the first aft frame 100. Similarly, the second side magnet 152 may be positioned along (but spaced apart from by the outer shell 132) the second side portion 108 of the second aft frame 101. In this way, the first side magnet 150 may be positioned at least partially within the first side slot 124, and the second side magnet 152 may be positioned at least partially within the second side slot 126. In other embodiments (not shown), the first side magnet 150 and the second side magnet 152 may each be a plurality of magnets connected to one another within the side seal 118.

As shown in FIG. 6, the first side magnet 150 and the second side magnet 152 may be arranged such that a repulsive magnetic force repels the first side magnet 150 and the second side magnet 152 away from one another and towards the respective slots 124, 126. As a result, the side seal 118 may be self-aligning in response to movements of the aft frames 100, 101 (e.g. vibrational movements or thermal growth/contraction). In exemplary embodiments, the first side magnet 150 and the second side magnet 152 are disposed between the radially inner magnet 130 and the radially outer magnet 128 such that a repulsive magnetic force 154 repels the radially inner magnet 130 and the radially outer magnet 128 away from the first side magnet 150 and the second side magnet 152. In many embodiments, all of the magnets 128, 130, 150, and 152 of the side seal 118 may be spaced apart from one another and arranged to produce repulsive forces 154 with respect to one another. As a result, the side seal 118 may be self-aligning in response to movements of the aft frames 100, 101, thereby increasing the efficiency of the sealing arrangement 200.

In the embodiment shown in FIG. 6, the first side magnet 150 may be magnetically attracted to the first aft frame 100 via an attractive magnetic force. For example, the first side magnet 150 may be magnetically attracted to the first side portion 106 of the first aft frame 100. Similarly, the second side magnet 152 may be magnetically attracted to the second aft frame 101. For example, the second side magnet 152 may be magnetically attracted to the second side portion 108 of the second aft frame 101. In such embodiments, the aft frames 100, 102 may each be formed of a ferrous metal, such that the magnets are attracted thereto.

In other embodiments, such as the one shown in FIG. 7, the aft frames 100, 101 may each be formed of a non-ferrous metal or material, such that they are not impacted by magnetic forces. In such embodiments, as shown in FIG. 7, the sealing arrangement 200 may further include a first aft frame magnet 156 is embedded within the first aft frame 100 and a second aft frame magnet 158 embedded within the second aft frame 101. For example, the first aft frame magnet 156 may be embedded within the first side portion 106 of the first aft frame 100 and arranged such that it magnetically attracts the first side magnet 150. Likewise, the second aft frame magnet 158 may be embedded within the second side portion 108 of the second aft frame 101 such that it magnetically attracts the second side magnet 152. In this way, the first side magnet 150 may be magnetically attracted to the first aft frame magnet 156, and the second side magnet 152 may be magnetically attracted to the second aft frame magnet 158.

In many embodiments, each of the magnets 128, 130, 150, 152, 156, 158 may be in the form of a piece of metal material that has its component atoms so ordered that the material exhibits properties of magnetism, such as attracting other iron-containing objects or aligning itself in an external magnetic field. In exemplary embodiments, the magnets 128, 130, 150, 152, 156, 158 may be Alnico magnets, such that they are permanent magnets that are primarily made up of a combination of aluminum, nickel, and cobalt but may also include copper, iron and titanium. Alnico magnets may be capable of operation in extremely high temperatures, such as upwards of 1000° F.

In many embodiments, the magnets 128, 130, 150, 152, 156, 158 may each include a first pole or north pole N and a second pole or south pole S. As is generally understood by those of skill in the art, the ends of a permanent magnet (such as the magnets 128, 130, 150, 152, 156, 158 described herein), are called its poles. One end is called the north pole, the other is called the south pole. If two magnets are oriented such the south pole of one faces the north pole of the other, the magnets will exhibit a force that pulls the magnets toward one other. Similarly, if two magnets are oriented such that two like poles are facing one another, the magnets will exhibit a force that repels the magnets away from one another. Although the magnets 128, 130, 150, 152, 156, 158 are shown in FIGS. 6 and 7 as having the poles labeled on specific ends, it is envisioned to be within the scope of the present disclosure that each of the poles may be switched, thereby yielding the same configuration but with an opposite magnetic pole orientation.

Figure 8:
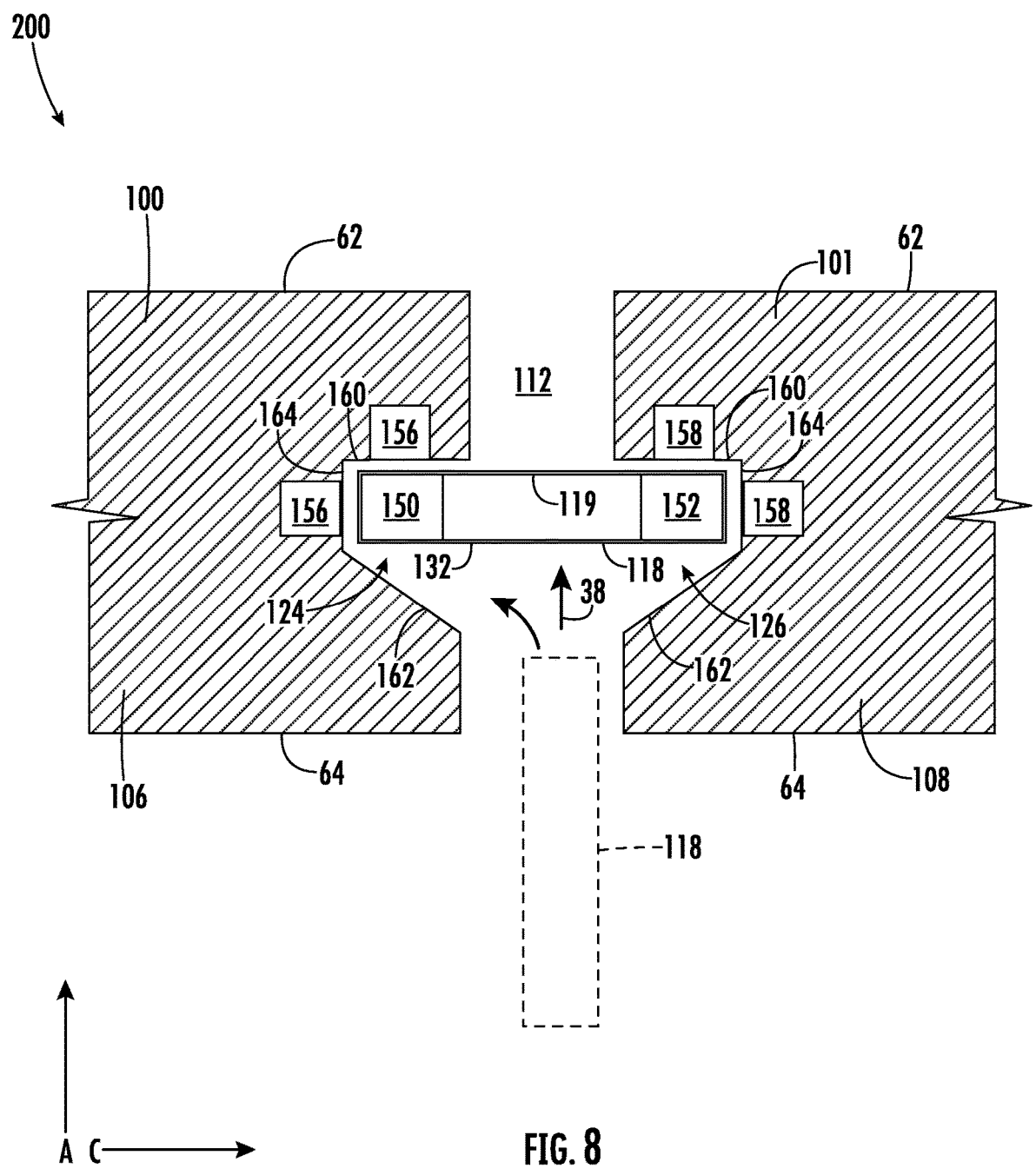
FIG. 8 illustrates a cross-sectional view of the sealing arrangement from along a radial direction, in accordance with embodiments of the present disclosure.

FIG. 8 illustrates a cross-sectional view of the sealing arrangement 200 from along a radial direction R. As shown, the first side slot 124 and the second side slot 126 may each include an aft wall 160, a tapered forward wall 162, and an axially extending side wall 164. For example, the slots 124 and 126 may each be defined collectively by the walls 160, 162, 164. In many embodiments the tapered forward wall 162 may allow the side seal 118 to be received by the slots 124 and 126 during the installation thereof (as illustrated by the dashed line and arrow in FIG. 8). For example, the tapered forward wall 162 may be generally sloped with respect to the aft wall 160 and the axially extending side wall 164.

In many embodiments, as shown in FIG. 8, the side seal 118 may have a substantially rectangular cross-sectional shape (having the longest side oriented in the circumferential direction C when installed). In particular embodiments, as shown in FIG. 8, the first aft frame magnet 156 may be embedded within the aft wall 160 and/or the axially extending side wall 164 of the first side portion 106 of the first aft frame 100. Likewise, the second aft frame magnet 158 may be embedded within the aft wall 160 and/or the axially extending side wall of the second side portion 108 of the second aft frame 101.

In operation, the sealing arrangement 200 described herein advantageously prevents combustion gases 34 from being diluted with compressed air prior to entrance into the turbine section 18. The side seal 118 described herein may be advantageously self-aligning in response to movements (e.g. vibrational movements and/or thermal movements) of the aft frames 100, 101 due to the various magnets 128, 130, 150, 152, 156, 158 exhibiting forces on the compliant outer shell 132 of the seal 118.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A sealing arrangement for a turbomachine, comprising:
a first aft frame and a second aft frame neighboring one another, the first aft frame and the second aft frame each comprising an inner portion and an outer portion, the outer portion radially separated from the inner portion, the first aft frame and the second aft frame each further comprising a first side portion and a second side portion that each extend radially between the inner portion and the outer portion, wherein a circumferential gap is defined between the first side portion of the first aft frame and the second side portion of the second aft frame; and a side seal extending across the circumferential gap, the side seal comprising one or more magnets, and wherein the side seal is at least partially held in place by the one or more magnets.

2. The sealing arrangement as in claim 1, wherein the first aft frame and the second aft frame each define a first side slot and a second side slot, the first side slot is defined along the first side portion and the second side slot is defined along the second side portion, and wherein the side seal extends into the first side slot of the first aft frame across the circumferential gap and into the second side slot of the second aft frame.

3. The sealing arrangement as in claim 2, wherein the first side seal slot and the second side seal slot each include a tapered forward wall for receiving the side seal.

4. The sealing arrangement as in claim 1, wherein the one or more magnets comprises a radially inner magnet and a radially outer magnet; and wherein an outer shell at least partially surrounds the radially inner magnet and the radially outer magnet.

5. The sealing arrangement as in claim 4, wherein the one or more magnets further comprises a first side magnet and a second side magnet positioned within the outer shell of the side seal opposite one another.

6. The sealing arrangement as in claim 5, wherein the first side magnet and the second side magnet are disposed between the radially inner magnet and the radially outer magnet such that a repulsive magnetic force repels the radially inner magnet and the radially outer magnet away from the first side magnet and the second side magnet.

7. The sealing arrangement as in claim 5, wherein a first aft frame magnet is embedded within the first aft frame, and wherein a second aft frame magnet is embedded within the second aft frame.

8. The sealing arrangement as in claim 7, wherein the first side magnet is magnetically attracted to the first aft frame magnet, and wherein the second side magnet is magnetically attracted to the second aft frame magnet.

9. The sealing arrangement as in claim 1, wherein an outer seal and an inner seal each extend across the circumferential gap; and wherein a radially outer magnet is coupled to the outer seal and a radially inner magnet is coupled to the inner seal.

10. The sealing arrangement as in claim 9, wherein the side seal extends between the inner seal and the outer seal.

11. A turbomachine comprising:
a compressor section;
a turbine section; and
a combustor section upstream from the turbine section and downstream from the compressor section, wherein a first combustor and a second combustor neighbor one another within the combustor section, the first combustor and the second combustor each including a transition duct having an upstream end and a downstream end, wherein a first aft frame surrounds the downstream end of the transition duct of the first combustor, wherein a second aft frame surrounds the downstream end of the transition duct of the second combustor, and wherein the first aft frame and the second aft frame each comprise:

an inner portion and an outer portion radially separated from the inner portion;

a first side portion and a second side portion that each extend radially between the inner portion and the outer portion;

wherein a circumferential gap is defined between the first side portion of the first aft frame and the second side portion of the second aft frame; and a side seal extending across the circumferential gap, the side seal comprising one or more magnets, and wherein the side seal is at least partially held in place by the one or more magnets.

12. The turbomachine as in claim 11, wherein the first aft frame and the second aft frame each define a first side slot and a second side slot, the first side slot is defined along the first side portion and the second side slot is defined along the second side portion, and wherein the side seal extends into the first side slot of the first aft frame across the circumferential gap and into the second side slot of the second aft frame.

13. The turbomachine as in claim 12, wherein the first side seal slot and the second side seal slot each include a tapered forward wall for receiving the side seal.

14. The turbomachine as in claim 11, wherein the one or more magnets comprises a radially inner magnet and a radially outer magnet; and wherein an outer shell at least partially surrounds the radially inner magnet and the radially outer magnet.

15. The turbomachine as in claim 14, wherein the one or more magnets further comprises a first side magnet and a second side magnet positioned within the outer shell of the side seal opposite one another.

16. The turbomachine as in claim 15, wherein the first side magnet and the second side magnet are disposed between the radially inner magnet and the radially outer magnet such that a repulsive magnetic force repels the radially inner magnet and the radially outer magnet away from the first side magnet and the second side magnet.

17. The turbomachine as in claim 15, wherein a first aft frame magnet is embedded within the first aft frame, and wherein a second aft frame magnet is embedded within the second aft frame.

18. The turbomachine as in claim 17, wherein the first side magnet is magnetically attracted to the first aft frame magnet, and wherein the second side magnet is magnetically attracted to the second aft frame magnet.

19. The turbomachine as in claim 11, wherein an outer seal and an inner seal each extend across the circumferential gap; and wherein a radially outer magnet is coupled to the outer seal and a radially inner magnet is coupled to the inner seal.

20. The turbomachine as in claim 19, wherein the side seal extends between the inner seal and the outer seal.

* * * * *